US008915318B2

(12) United States Patent
Lin

(10) Patent No.: US 8,915,318 B2
(45) Date of Patent: Dec. 23, 2014

(54) SHIFTING MACHINE STRUCTURE

(71) Applicant: Jin-Liang Lin, Tainan (TW)

(72) Inventor: Jin-Liang Lin, Tainan (TW)

( * ) Notice: Subject to any disclaimer, the term of this patent is extended or adjusted under 35 U.S.C. 154(b) by 26 days.

(21) Appl. No.: 13/845,213

(22) Filed: Mar. 18, 2013

(65) Prior Publication Data

US 2014/0265232 A1 Sep. 18, 2014

(51) Int. Cl.
*B62D 51/04* (2006.01)
*A61G 5/10* (2006.01)
*A61G 15/02* (2006.01)

(52) U.S. Cl.
CPC ................ *A61G 5/10* (2013.01); *A61G 5/1059* (2013.01); *A61G 15/02* (2013.01); *A61G 5/1056* (2013.01)
USPC ........ 180/19.1; 180/19.2; 180/19.3; 280/657; 280/650; 297/344.19

(58) Field of Classification Search
CPC ... A61G 5/1056; A61G 5/1059; A61G 15/02; A61G 2005/1081
USPC ............... 180/19.1, 19.2, 19.3; 280/657, 650; 297/344.19
See application file for complete search history.

(56) References Cited

U.S. PATENT DOCUMENTS 4,552,404 A * 11/1985 Congleton .................... 297/330
5,884,935 A * 3/1999 Tholkes ........................ 280/657
6,565,112 B2 * 5/2003 Hanson et al. ................ 280/650
6,846,042 B2 * 1/2005 Hanson et al. ........... 297/411.36
7,716,759 B2 * 5/2010 Wilder ............................. 5/83.1
8,316,480 B2 * 11/2012 Burak et al. ...................... 5/87.1
8,662,588 B1 * 3/2014 Delmestri ................ 297/344.16

* cited by examiner

*Primary Examiner* — Joseph M Rocca
*Assistant Examiner* — Marlon Arce
(74) *Attorney, Agent, or Firm* — Alan Kamrath; Kamrath IP Lawfirm, P.A.

(57) ABSTRACT

A shifting machine structure contains a base unit, a seat unit, a hydraulic unit, a cushion support unit, a rod unit, and a control handle unit. Thereby, a pressing pedal and a releasing pedal of the hydraulic unit are pedaled to move the elderly or patients toward a desired position by using the base unit, the seat unit, the hydraulic unit, the cushion support unit, the rod unit, and the control handle unit, thus obtaining delivery safety and convenience. In addition, a copper sleeve and a copper piece of each of plural shafts of the seat unit rub with each other to enhance rigidity and durability.

4 Claims, 7 Drawing Sheets

SHIFTING MACHINE STRUCTURE

BACKGROUND OF THE INVENTION

1. Field of the Invention

The present invention relates to a shifting machine structure in which a pressing pedal and a releasing pedal of a hydraulic unit are pedaled to move the elderly or patients toward a desired position by using a base unit, a seat unit, the hydraulic unit, a cushion support unit, a rod unit, and a control handle unit, thus obtaining delivery safety and convenience.

2. Description of the Prior Art

Conventionally, elders, who have reduced mobility or have limb degradation, have to be taken care of by nurses in daily life. However, when manually holding or carrying the elders or patients to another position from a bed, a wheel chair or transportation, the nurses have to consume energy and time.

The present invention has arisen to mitigate and/or obviate the afore-described disadvantages.

SUMMARY OF THE INVENTION

The primary objective of the present invention is to provide a shifting machine structure in which a pressing pedal and a releasing pedal of a hydraulic unit are pedaled to move the elderly or patients toward a desired position by using a base unit, a seat unit, the hydraulic unit, a cushion support unit, a rod unit, and a control handle unit, thus obtaining delivery safety and convenience.

Another objective of the present invention is to provide a shifting machine structure in which a copper sleeve and a copper piece of each of plural shafts of the seat unit rub with each other to enhance rigidity and durability.

To obtain the above objectives, shifting machine structure contains a base unit including a frame, a plurality of wheels fixed around a bottom end of the frame, two supports extending upwardly from two sides of the frame, and a bottom plate disposed in the frame. A seat unit includes a post set mounted on a central position of a bottom end of a seat and having a bottom end disposed on the bottom plate. A plurality of shaft sets is fixed on the bottom end of the seat and on the bottom plate. The post set has an outer post and an inner post moving relative to the outer post. Each shaft set has an outer shaft and an inner shaft moving relative to the outer shaft. The outer shaft has a copper sleeve covered around an inner wall of the outer shaft, and the inner shaft has a copper piece mounted on a frictional contact position of an outer rim thereof relative to the copper sleeve so that the copper piece rubs and contacts with the copper sleeve. A hydraulic unit includes a hydraulic cylinder. Between the hydraulic cylinder and the post set is defined a pipe for feeding hydraulic oil. The hydraulic unit includes a pressing pedal for pressurizing and a releasing pedal for releasing pressure disposed on one side of the frame. Thus, the hydraulic cylinder is pressurized and pressure is released relative to the post set. The pressing pedal is arranged to pressure the hydraulic oil to the hydraulic cylinder relative to the post set, such that the seat is lifted, and the releasing pedal is used to release the hydraulic oil from the hydraulic cylinder relative to the post set, so that the seat is descended. A rod unit includes a positioning stem secured at a predetermined position of the bottom plate, and the positioning stem has a connecting tab disposed on a top end thereof. The connecting tab is axially coupled with an axial hole of a rotary shank by using a first pivoting member and a coupling member. The rotary shank has an extending ear, and the extending ear has an orifice defined therein and connecting with an aperture of a movable shank by ways of a second pivoting member and a fixing member. The movable shank has a plurality of retractable fix latches and a pore defined on a distal end thereof. The rotary shank has a plurality of fixing holes formed on one side thereof. The cushion support unit has a cushion and a positioning pillar fixed on a back end thereof. The positioning pillar has a retracting space defined therein and fitted onto the rotary shank to slide, and the positioning pillar has a plurality of bores defined thereon and corresponding to the plurality of fixing holes of the rotary shank. A locating pin is provided to insert into one of the plurality of bores and the plurality of fixing holes to adjust a shifting machine to move upwardly and downwardly. A control handle unit includes a rack fixed at a predetermined position of a front end of the frame, a horizontal grip extending from a free end of the rack, and a connection tab secured on a rear end of the rack. The connection tab is fixed in the pore of the movable shank.

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

Figure 1:
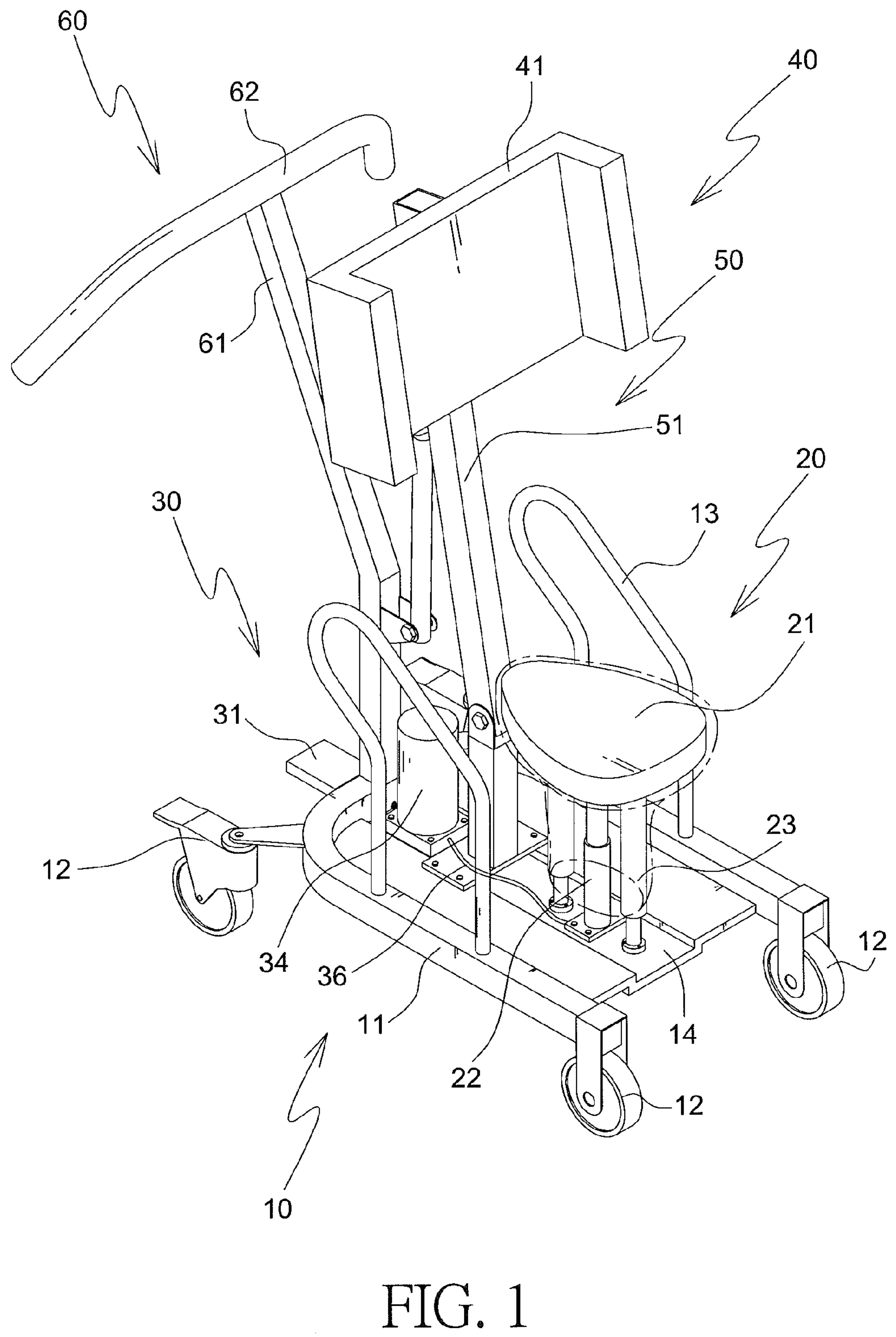
FIG. 1 is a perspective view of the assembly showing a shifting machine structure according to a preferred embodiment of the present invention.
Figure 2:
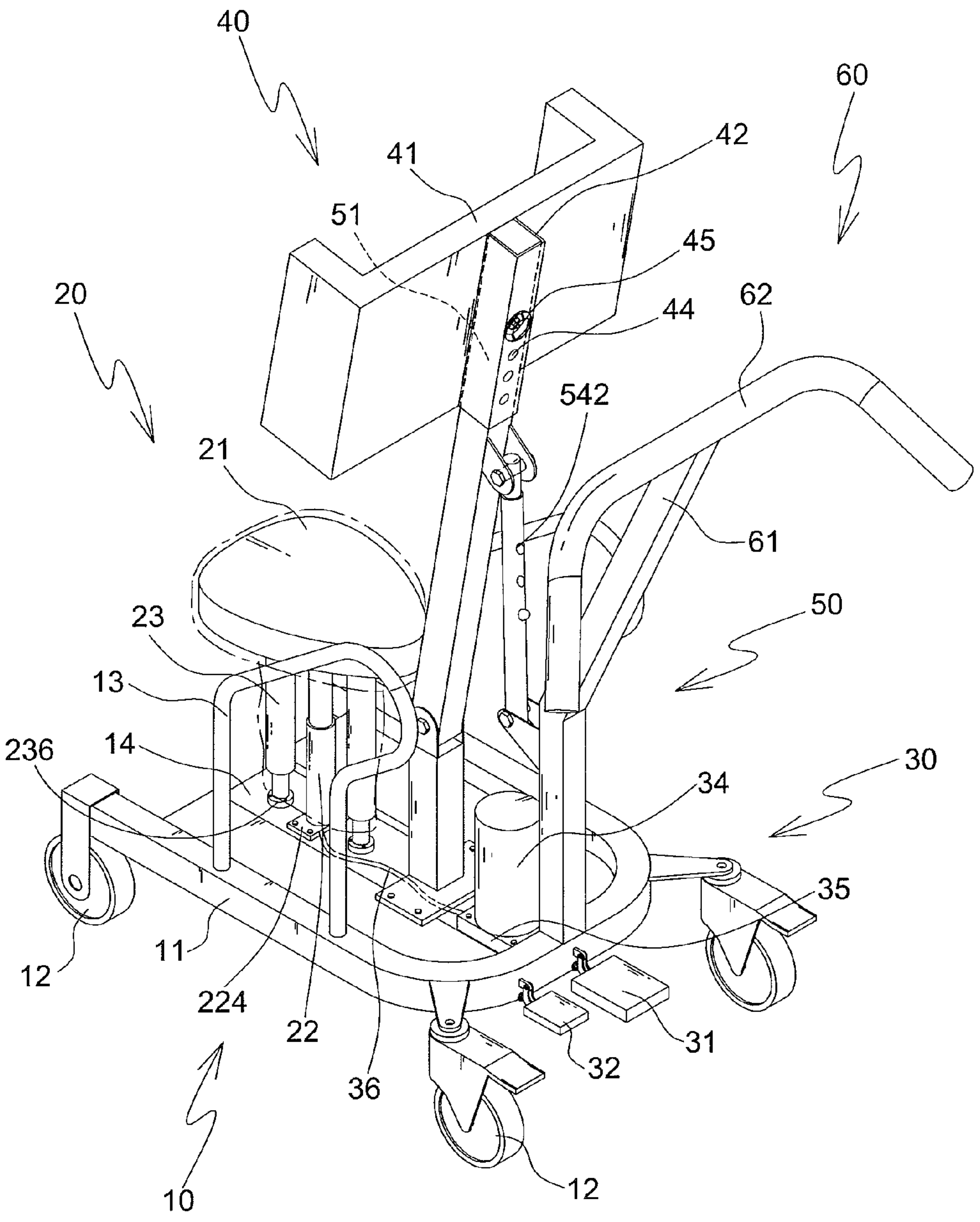
FIG. 2 is another perspective view of the assembly showing the shifting machine structure according to the preferred embodiment of the present invention.
Figure 3:
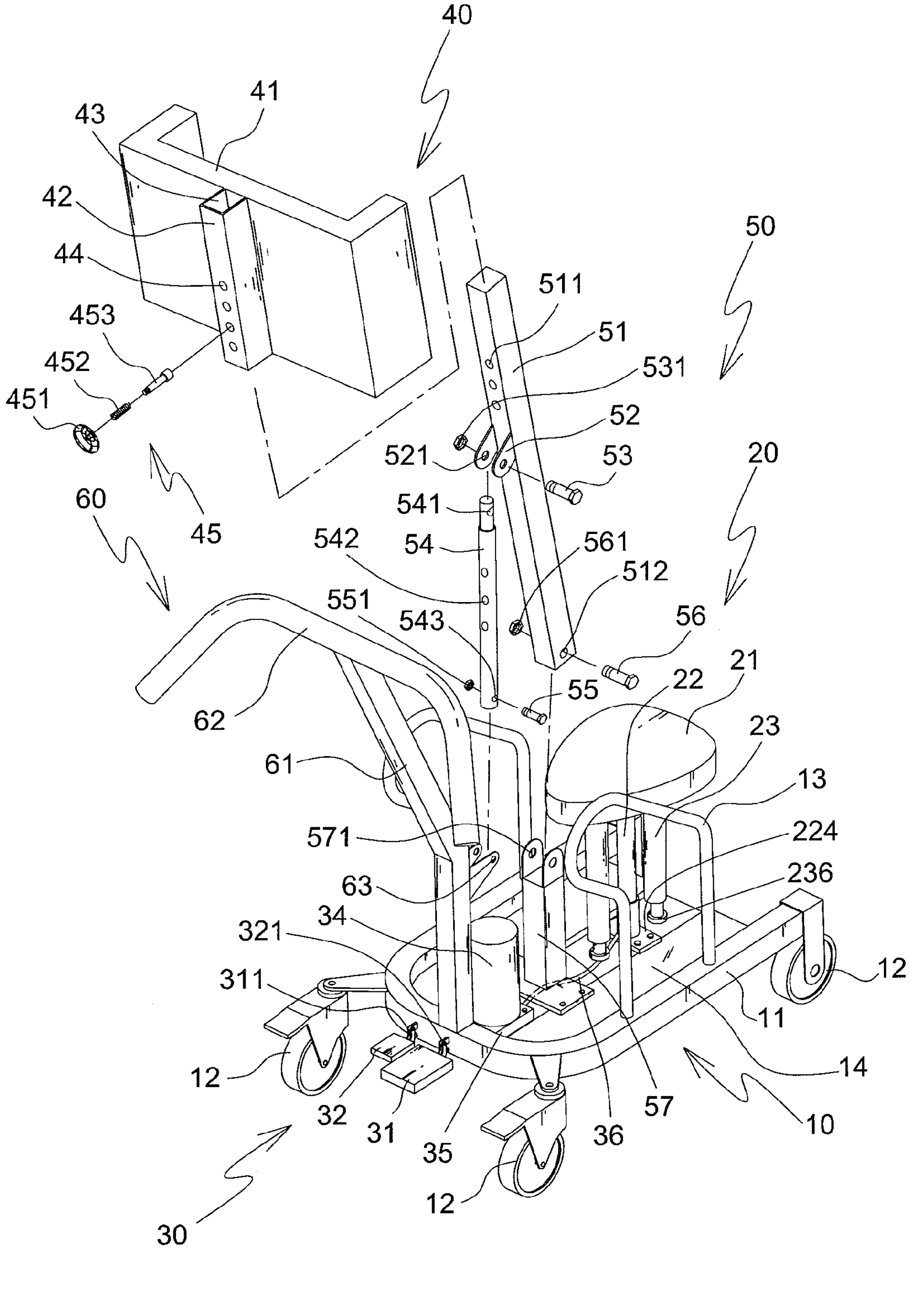
FIG. 3 is a perspective view of the exploded components showing the shifting machine structure according to the preferred embodiment of the present invention.
Figure 4:
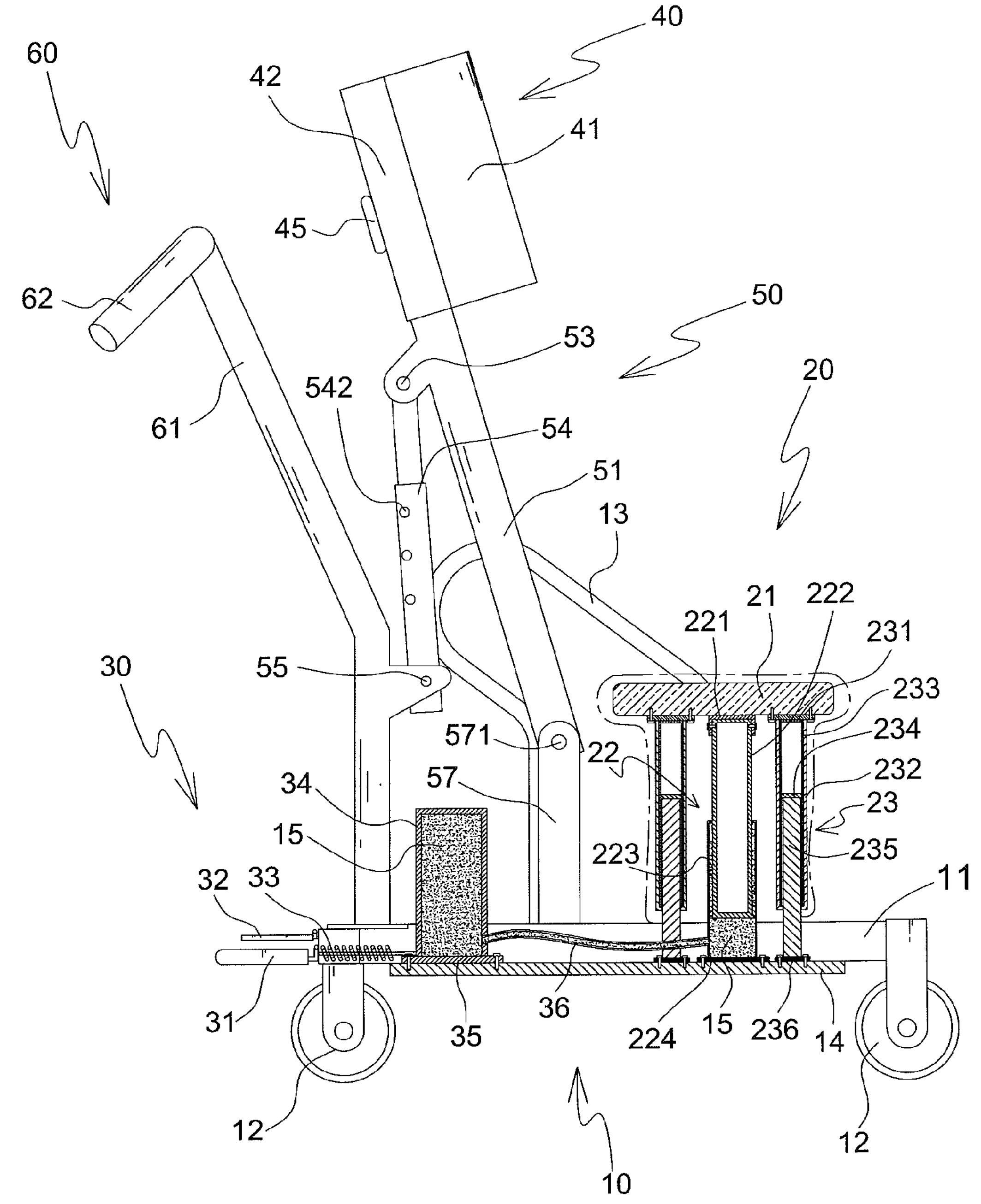
FIG. 4 is a cross sectional view of a part of the assembly showing the shifting machine structure according to the preferred embodiment of the present invention.
Figure 5:
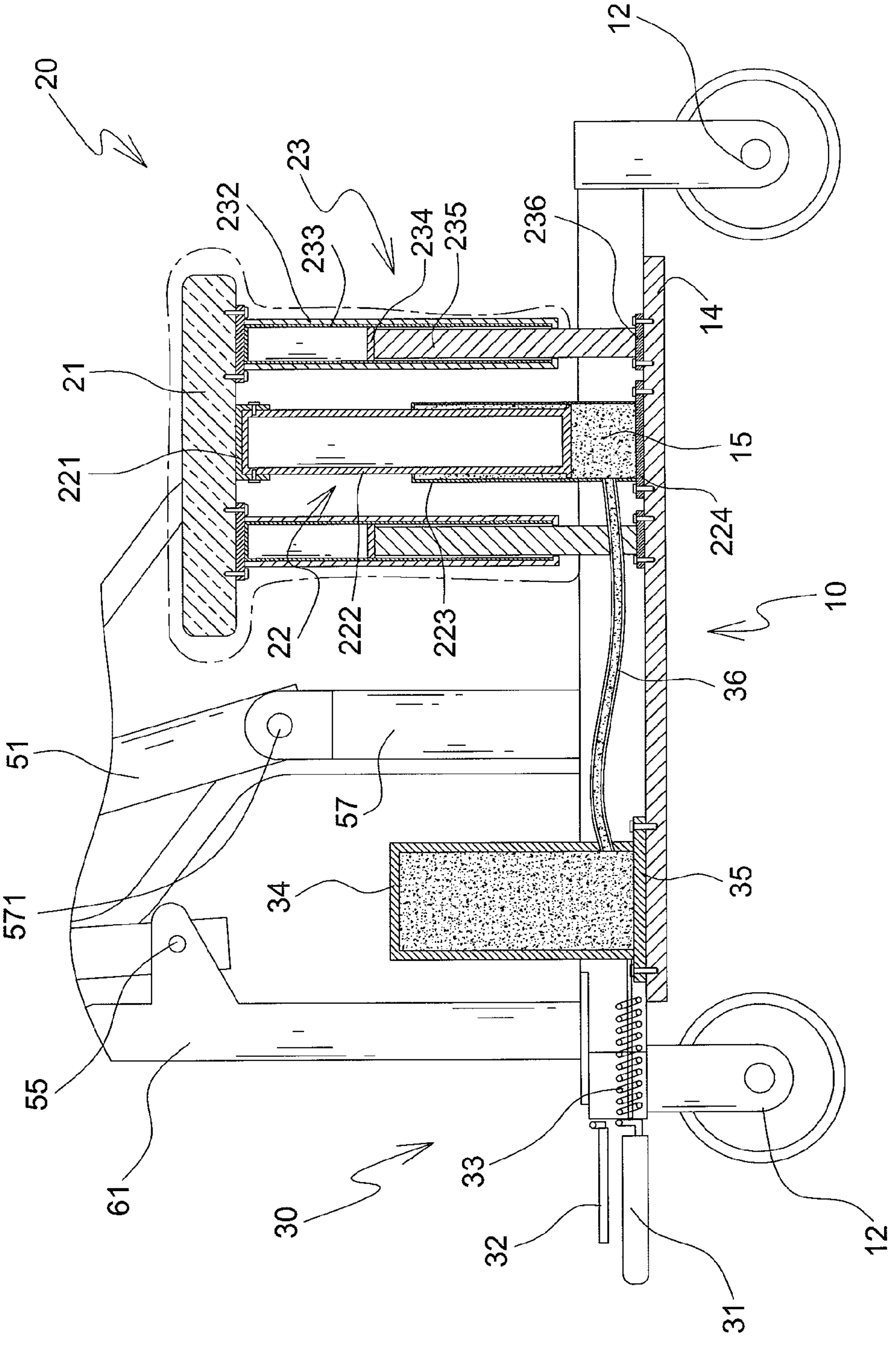
FIG. 5 is another cross sectional view of a part of the assembly showing the shifting machine structure according to the preferred embodiment of the present invention.
Figure 6:
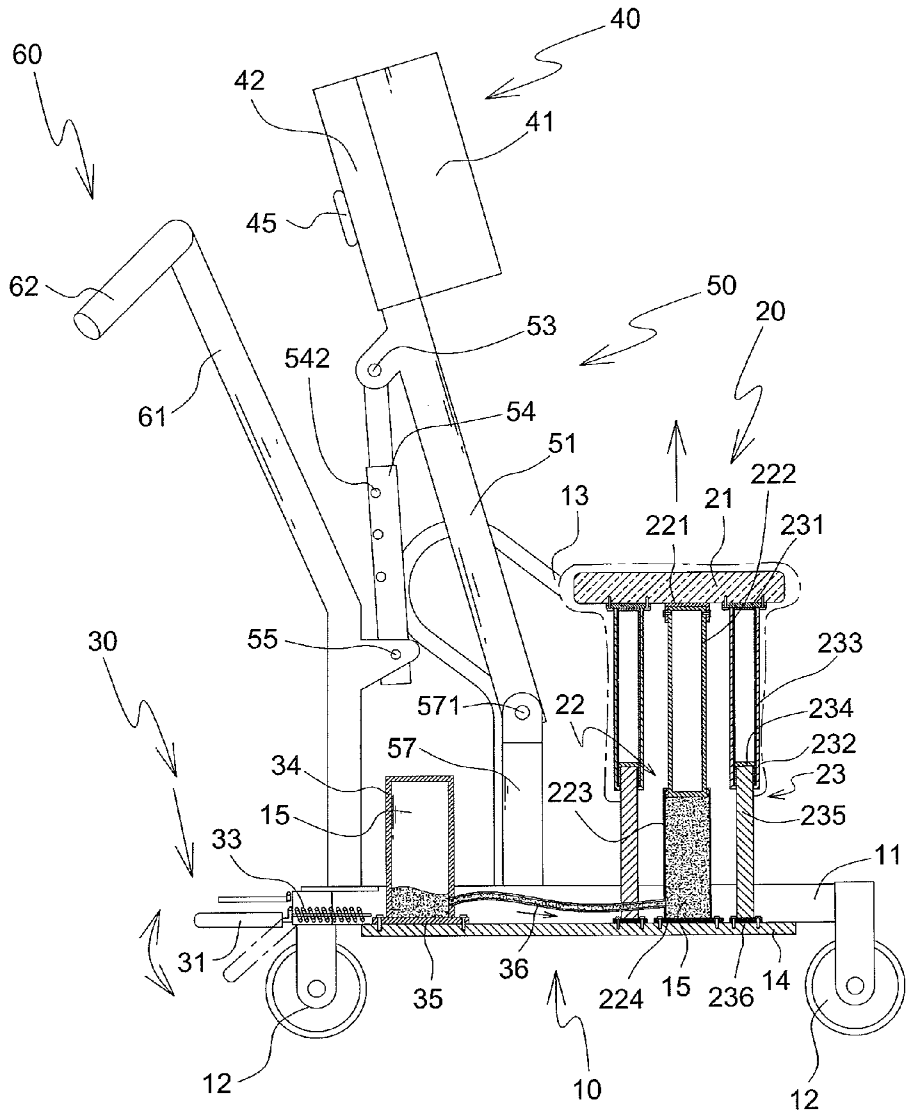
FIG. 6 is a cross sectional view of the operation showing the shifting machine structure according to the preferred embodiment of the present invention.
Figure 7:
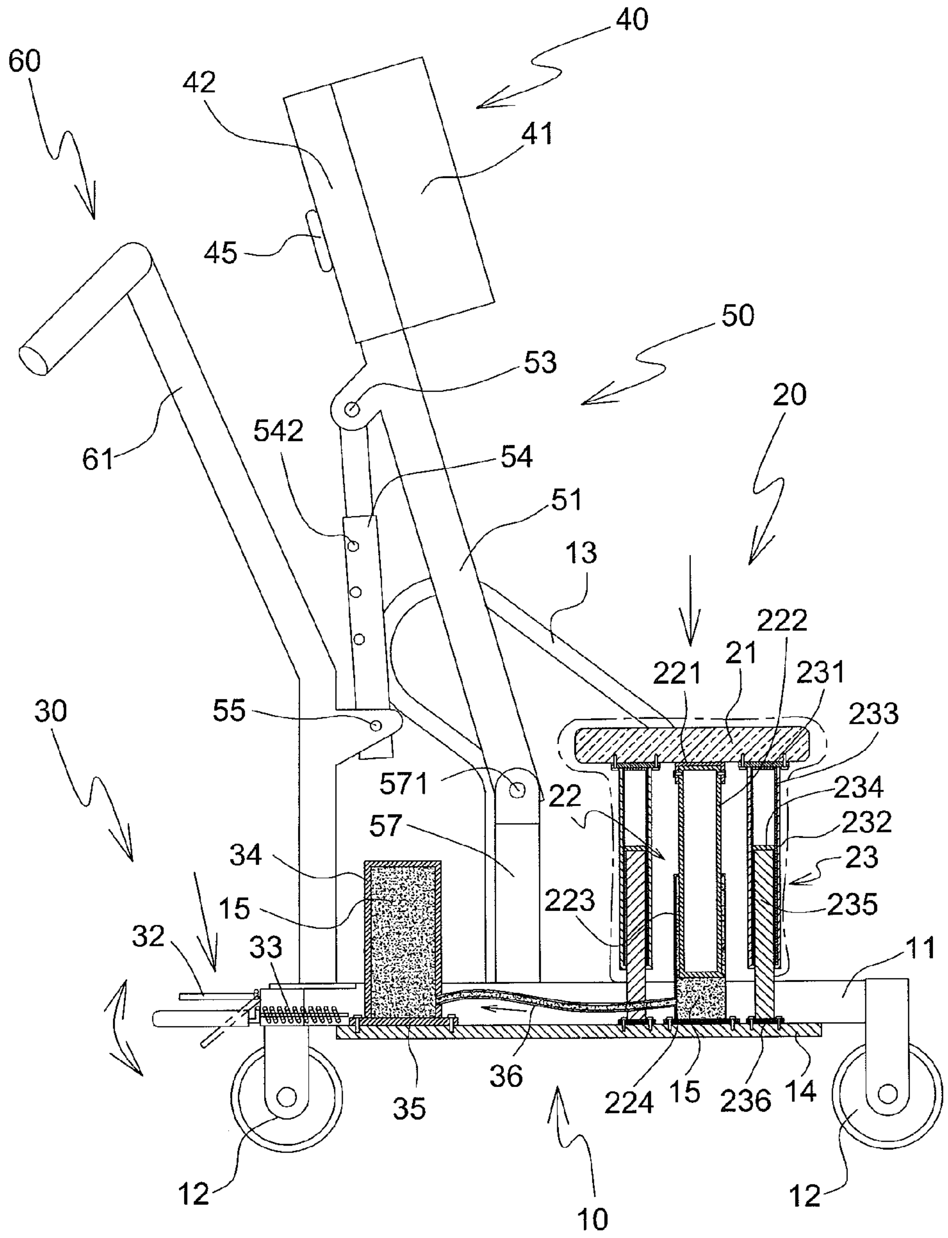
FIG. 7 is another cross sectional view of the operation showing the shifting machine structure according to the preferred embodiment of the present invention.

With reference to FIGS. 1-7, a shifting machine structure according to a preferred embodiment of the present invention comprises a base unit 10 including a frame 11, a plurality of wheels 12 fixed around a bottom end of the frame 11, two supports 13 extending upwardly from two sides of the frame 11, and a bottom plate 14 disposed in the frame 11.

A seat unit 20 includes a post set 22 mounted on a central position of a bottom end of a seat 21 and having a bottom end disposed on the bottom plate 14. A plurality of shaft sets 23 is fixed on the bottom end of the seat 21 and on the bottom plate 14. The post set 22 has an outer post 223 and an inner post 222 moving relative to the outer post 223. Each shaft seat 23 has an outer shaft 232 and an inner shaft 235 moving relative to the outer shaft 232. The outer shaft 232 has a copper sleeve 233 covered around an inner wall of the outer shaft 232, and the inner shaft 235 has a copper piece 234 mounted on a frictional contact position of an outer rim thereof relative to the copper sleeve 233, so that the copper piece 234 rubs and contacts with the copper sleeve 233. The inner post 222 of the post set 22 has a first deck 221 fixed on a distal end thereof and facing to the bottom end of the seat 21, and the outer post 223 of the post set 22 has a second deck 224 secured on a distal end thereof and facing to an end surface of the bottom plate 14. The outer shaft 232 of the each shaft seat 23 has a first panel 231 mounted on a distal end thereof and facing to the bottom end of the seat 21, and the inner shaft 235 of the each shaft seat 23 has a second panel 236 disposed on a distal end thereof and facing to the end surface of the bottom plate 14.

A hydraulic unit 30 includes a hydraulic cylinder 34 and a holder 35 arranged on the bottom end of the bottom plate 14 to fix the hydraulic cylinder 34. Between the hydraulic cylinder 34 and the post set 22 is defined a pipe 36 for feeding hydraulic oil 15. The hydraulic unit 30 includes a pressing pedal 31 for pressurizing and a releasing pedal 32 for releasing pressure disposed on one side of the frame 11, such that the hydraulic cylinder 34 is pressurized and pressure is released relative to the post set 22. The pressing pedal 31 is arranged to pressurize the hydraulic oil 15 to the hydraulic cylinder 34 relative to the post set 22, such that the seat 21 is lifted, and the releasing pedal 32 is used to release the hydraulic oil 15 from the hydraulic cylinder 34 relative to the post set 22 so that the seat 21 is descended. The pressing pedal 31 has a rotatable supporting portion 321 and a first resilient element 33 fixed on an outer rim of the frame 11 to be pedaled to return back to an original position. The releasing pedal 32 also has a rotating portion 311 and a second resilient element 33 mounted on the outer rim of the frame 11 to be pedaled to return back to an original position.

A rod unit 50 includes a positioning stem 57 secured at a predetermined position of the bottom plate 14. The positioning stem 57 has a connecting tab 571 disposed on a top end thereof, and the connecting tab 571 is axially coupled with an axial hole 512 of a rotary shank 51 by using a first pivoting member 56 and a coupling member 561. The rotary shank 51 has an extending ear 52, and the extending ear 52 has an orifice 521 defined therein and connecting with an aperture 541 of a movable shank 54 by ways of a second pivoting member 53 and a fixing member 531. The movable shank 54 has a plurality of retractable fix latches 542 and a pore 543 defined on a distal end thereof. The rotary shank 51 has a plurality of fixing holes 511 formed on one side thereof.

A cushion support unit 40 has a cushion 41 and a positioning pillar 42 fixed on a back end thereof. The positioning pillar 42 has a retracting space 43 defined therein and fitted onto the rotary shank 51 to slide. The positioning pillar 42 also has a plurality of bores 44 defined thereon and corresponding to the plurality of fixing holes 511 of the rotary shank 51. A locating pin 45 is provided to insert into one of the plurality of bores 44 and the plurality of fixing holes 511 to adjust a shifting machine to move upwardly and downwardly. The locating pin 45 has an extension 453 and a knob 451 coupling with the extension 453, and between the knob 451 and the extension 453 is defined a spring 452.

A control handle unit 60 includes a rack 61 fixed at a predetermined position of a front end of the frame 11, a horizontal grip 62 extending from a free end of the rack 61, and a connection tab 63 secured on a rear end of the rack 61. The connection tab 63 is fixed in the pore 543 of the movable shank 54 by a first connector 55 and a second connector 551.

Thereby, the pressing pedal 31 and the releasing pedal 32 are pedaled to move the elderly or patients toward a desired position by using the base unit 10, the seat unit 20, the hydraulic unit 30, the cushion support unit 40, the rod unit 50, and the control handle unit 60, thus obtaining delivery safety and convenience. In addition, the copper sleeve 233 and the copper piece 234 of the each shaft seat 23 rub with each other to enhance rigidity and durability.

While various embodiments in accordance with the present invention have been shown and described, it is clear to those skilled in the art that farther embodiments may be made without departing from the scope of the present invention.

What is claimed is:

1. A shifting machine structure comprising:

a base unit including a frame, a plurality of wheels fixed around a bottom end of the frame, a two supports extending upwardly from two sides of the frame, and a bottom plate disposed in the frame;

a seat unit including a post set mounted on a central position of a bottom end of a seat and having a bottom end disposed on the bottom plate, with a plurality of shaft sets fixed on the bottom end of the seat and on the bottom plate, wherein the post set has an outer post and an inner post moving relative to the outer post, wherein each shaft set has an outer shaft and an inner shaft moving relative to the outer shaft, wherein the outer shaft has a copper sleeve covered around an inner wall of the outer shaft, wherein the inner shaft has a copper piece mounted on a frictional contact position of an outer rim thereof relative to the copper sleeve, and wherein the copper piece rubs and contacts with the copper sleeve;

a hydraulic unit including a hydraulic cylinder, wherein between the hydraulic cylinder and the post set is defined a pipe for feeding hydraulic oil, with the hydraulic unit including a pressing pedal for pressurizing and a releasing pedal for releasing pressure disposed on one side of the frame, wherein the hydraulic cylinder is pressurized and the pressure is released relative to the post set, wherein the pressing pedal pressurizes the hydraulic oil to the hydraulic cylinder relative to the post set such that the seat is lifted, and wherein the releasing pedal is used to release the hydraulic oil from the hydraulic cylinder relative to the post set so that the seat is descended;

a rod unit including a positioning stem secured at a predetermined position of the bottom plate, wherein the positioning stem has a connecting tab disposed on a top end thereof, wherein the connecting tab is axially coupled with an axial hole of a rotary shank by using a first pivoting member and a coupling member, wherein the rotary shank has an extending ear, wherein the extending ear has an orifice defined therein and connecting with an aperture of a movable shank by ways of a second pivoting member and a fixing member, wherein the movable shank has a plurality of retractable fix latches and a pore defined on a distal end thereof, wherein the rotary shank has a plurality of fixing holes formed on one side thereof;

a cushion support unit having a cushion and a positioning pillar fixed on a back end thereof, wherein the positioning pillar has a retracting space defined therein and fitted onto the rotary shank to slide, wherein the positioning pillar has a plurality of bores defined thereon and corresponding to the plurality of fixing holes of the rotary shank;

a locating pin inserted into one of the plurality of bores and the plurality of fixing holes to adjust a shifting machine to move upwardly and downwardly; and a control handle unit including a rack fixed at a predetermined position of a front end of the frame, a horizontal grip extending from a free end of the rack, and a connection tab secured on a rear end of the rack, wherein the connection tab is fixed in the pore of the movable shank.

2. The shifting machine structure as claimed in claim 1, wherein the inner post of the post set has a first deck fixed on a distal end thereof and facing to the bottom end of the seat, wherein the outer post of the post set has a second deck secured on a distal end thereof and facing an end surface of the bottom plate; wherein the outer shaft of the each shaft seat has a first panel mounted on a distal end thereof and facing the bottom end of the seat, and wherein the inner shaft of the each shaft seat has a second panel disposed on a distal end thereof and facing the end surface of the bottom plate.

3. The shifting machine structure as claimed in claim 1, wherein the pressing pedal has a rotatable supporting portion and a first resilient element fixed on an outer rim of the frame, and wherein the releasing pedal has a rotating portion and a second resilient element mounted on the outer rim of the frame.

4. The shifting machine structure as claimed in claim 1, wherein the locating pin has an extension and a knob coupling with the extension, and wherein between the knob and the extension is defined a spring.

* * * * *